(12) United States Patent
Ning

(10) Patent No.: US 6,282,033 B1
(45) Date of Patent: Aug. 28, 2001

(54) LENS WITH EXTERNAL APERTURE STOP

(76) Inventor: Alex Ning, 2930 Zircon Pl., Carlsbad, CA (US) 92009

( * ) Notice: Subject to any disclaimer, the term of this patent is extended or adjusted under 35 U.S.C. 154(b) by 0 days.

(21) Appl. No.: 09/405,076

(22) Filed: Sep. 27, 1999

Related U.S. Application Data

(63) Continuation-in-part of application No. 09/390,992, filed on Sep. 7, 1999, now abandoned.

(51) Int. Cl.[7] .............................. G02B 9/00; G02B 9/06
(52) U.S. Cl. ........................................ 359/739; 359/794
(58) Field of Search ............................ 359/738, 739, 359/793–795

(56) References Cited

U.S. PATENT DOCUMENTS

| | | | |
|---|---|---|---|
| 4,212,517 | 7/1980 | Fugii | 359/763 |
| 4,525,039 | 6/1985 | Defuans | 359/739 |
| 5,657,170 | * 8/1997 | Yahagi et al. | 359/774 |
| 5,966,251 | * 10/1999 | Nagahara | 359/773 |

FOREIGN PATENT DOCUMENTS

| | | | |
|---|---|---|---|
| 58-166315-A | * 10/1983 | (JP) | 359/774 |
| 62-90610-A | * 4/1987 | (JP) | 359/739 |

* cited by examiner

Primary Examiner—Evelyn A Lester
(74) Attorney, Agent, or Firm—Donn K. Harms

(57) ABSTRACT

A lens assembly particularly suited to use with high resolution digital cameras and other portable electronic devices. The lens includes a positive powered front group having one or two elements and a second, aberration correcting, rear group having in order from the front a bi-concave element, a meniscus element and a bi-concave element. The aperture stop plane is just in front of the front group. A combined operator and shutter device is positioned at the aperture stop plane. All of the lens elements are made of glass and have spherical surfaces.

14 Claims, 1 Drawing Sheet

LENS WITH EXTERNAL APERTURE STOP

This application is a continuation in part of copending U.S. patent application Ser. No. 09/390,992, filed Sep. 7, 1999, now abandoned.

FIELD OF THE INVENTION

This invention relates to compact lenses for camera applications; in particular, for digital cameras.

BACKGROUND OF THE INVENTION

Digital cameras utilizing high-resolution electronic imaging sensors (so-called "megapixel" cameras) require high resolution optics. For the consumer market, it is important that the lenses can be produced in high volume inexpensively. With many sensors, a mechanical shutter and/or a variable aperture are necessary or desirable to optimize the imaging performance of the sensor.

A variable aperture is generally desirable to enable the camera to take acceptable pictures in a wide range of lighting conditions. Where the environment is darker, the aperture must be fully open to allow sufficient light to illuminate the sensor at an optimum level. In a brighter environment the aperture must be reduced to limit the intensity of light reaching the sensor to the optimum level and prevent saturation of the sensor. Also, the depth of field is increased when the aperture is reduced, allowing objects to be in good focus over a greater range of distances.

For some types of sensors, generally known as "frame-transfer sensors", the active area of the sensor must be shielded from illumination completely during image readout from the sensor to obtain clean data from the sensor. Typically, this is accomplished using a conventional mechanical shutter of the sort used in film cameras.

A single mechanical device can perform both shutter and variable aperture functions. Such a dual-function device is advantageous, since it requires less space than separate, independent, shutter and variable aperture devices, making the lens assembly more compact and less expensive. For proper functioning of the variable aperture, the dual-function device must be located at the aperture stop (also known as the iris position) of the lens design, at the conventional location where an independent variable aperture would be located.

In the prior art, high resolution lenses have generally been made up of several individual lens elements in order to balance the inherent optical aberrations. These lenses that require a large number of elements tend to be relatively large, heavy and expensive to manufacture. The cost of these lenses increases with the number of elements and the resulting increased costs in assembling and mounting them in a lens cell. Prior lenses are generally designed using all spherical surfaces or using at least some aspheric elements in which one or both surfaces are non-spherical.

Where all elements have spherical surfaces, generally a high number of lens elements is required, making the lens long and heavy and expensive to produce. A compact lens is required for such devices as pocket size consumer cameras, cell phones and personal digital assistants.

Aspheric lenses have some optical advantages, but cannot be easily produced by traditional grinding and polishing techniques. Aspheric elements are typically produced by molding plastics or low melt temperature glasses. While molded plastic elements are inexpensive to produce, the level of precision of the lenses is not sufficient for high-resolution cameras. In addition, the optical properties of most plastic materials change with changes in temperature and humidity. While it is possible to make glass aspheric lens elements, manufacturing to the required accuracy is difficult and expensive when compared to manufacture of spherical lens elements.

Prior lens designs generally have separate variable apertures and shutters, increasing the length of the lens assembly. Even where both these functions are combined in one device, that device must be positioned between lens elements because the aperture stops of conventional designs are located between lens elements.

Having the aperture stop between lens elements, as in the Double Gaussian designs, is believed to make correction of aberrations easier. Typical of such lens designs is that described by Fugii in U.S. Pat. No. 4,212,517, where the aperture stop is located between the third and fourth elements. This provides a degree of lens symmetry about the apertures stop, resulting in reduction in off-axis aberrations such as coma and distortion. It is generally believed that achieving good aberration correction without this symmetrical arrangement of lens elements would be difficult. However, it is difficult and expensive to integrate a variable aperture/shutter device with this type of optical design since it is difficult to keep the lens elements precisely with the aperture device located between the elements.

Defuans, in U.S. Pat. No. 4,525,039, describes a lens design with the aperture stop in front of the first element. That design requires that the first element must be plano-convex, with the plano surface facing the aperture. However, that deign has a maximum relative aperture of f/4, too slow for use with cameras to be used at relatively low light levels. That design further requires seven elements, making it excessively long, heavy and expensive to products for use in compact cameras, especially in compact digital cameras.

Therefore, there is a continuing need for improved lenses that have excellent low-light performance and are compact, short, light weight and inexpensive to produce while using conventional, well-proven manufacturing methods.

SUMMARY OF THE INVENTION

The above-noted problems, and others, are overcome in accordance with this invention by a lens for portable digital devices, in particular digital cameras, which has an aperture stop in front of the lens, external to the lens, where a combined variable aperture and shutter can be easily positioned with precision.

The lens comprises two spaced lens groups. The first lens group is either a double-convex element or a positively powered achromatic doublet having two elements. Optimally, the second lens group comprises, from the front of the lens, a first bi-concave element, a second meniscus element and a third bi-convex element. All of the lens elements have spherical surfaces and are made of suitable glass materials.

The aperture/shutter device is external to the optical elements, so the optical elements can be assembled into a precision lens barrel independent of the aperture/shutter device. The performance of such a lens can be tested and verified before integration with an aperture/shutter device. Integration of such pre-assembled lenses with the aperture/shutter device can be performed with high reliability and repeatability, resulting in high yields in volume manufacturing.

It is, therefore, an object of this invention to provide a compact lens assembly particularly suitable for use with portable digital devices, such as digital cameras.

Another object is to provide a compact lens assembly having an aperture stop external to the lens assembly where a combined variable aperture and shutter device can be positioned.

A further object is to provide an asymmetric lens assembly with improved optical performance and having all glass lens elements with spherical surfaces.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
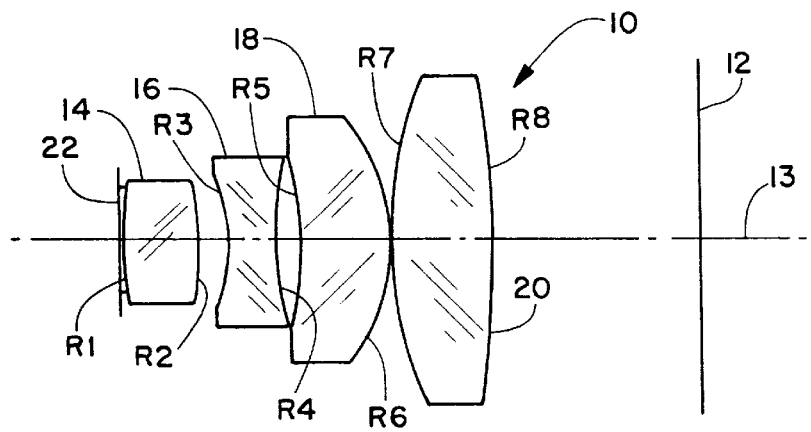
FIG. 1 is a schematic axial section view of a first embodiment of the lens of this invention.

Referring to FIG. 1, there is seen a schematic axial section view of a lens assembly 10 for forming an image at a image plane 12, which in a digital camera is the sensor plane and in a film type camera is the film plane. The front or distal end of the lens is to the left in FIG. 1. Line 13 represents the lens optical axis.

The lens assembly 10 includes a bi-convex distal lens element 14 and a proximal lens group including a first bi-concave element 16, a second meniscus element 18 and a third bi-convex element 20. The aperture stop plane is schematically indicated by line 22, closely adjacent to distal lens element 14. Distal element 14 provides most of the focussing power while the proximal group of elements 16, 18 and 20 provides aberration compensation to correct for any optical imperfections present in element 14. Any suitable spacing between lens elements may be used. Aperture stop 22 is preferably as close to distal element 14 as is practical. Overall length from aperture stop 22 to image plane 12 for the lens of this embodiment is typically about 8 mm.

All four elements 14, 16, 18 and 20 have spherical surface shapes and are formed from a suitable glass. Any suitable anti-reflection or other coatings may be applied to the lens elements.

Lens 10 of FIG. 1 is completely asymmetrical. This lens will provide excellent image quality over a field of view of +/−30 degrees at a relative aperture as large as f/2.8. This lens is well suited for use with state of the art digital sensors having pixel sizes as small as four microns and a number of pixels as high as two million. The maximum geometric distortion of this lens is typically under about 2%.

Details of the structure of an optimum version of the FIG. 1 general embodiment is provided in Table I. All radii and distances are in millimeters. Each lens is identified by the corresponding drawing reference number, with surfaces defined by serial radius numbers from the distal to proximal end. The overall length from the aperture stop to the image plane is 8.05 mm.

TABLE I

| Element, | Surface Radius | Axial Distance | Index of Refraction | Abbe Number |
|---|---|---|---|---|
| 22 Aperture Stop | — | .019358679 | | |
| 14, R1 | 3.8630600 | .97497407 | 1.85544 | 36.59 |
| 14, R2 | −10.949689 | .41938736 | | |
| 16, R3 | −3.5840039 | .70701838 | 1.91761 | 21.51 |
| 16, R4 | 5.5340363 | .33068768 | | |
| 18, R5 | −6.0461650 | 1.2803852 | 1.80279 | 46.76 |
| 18, R6 | −2.8591050 | 0.0 | | |
| 20, R7 | 6.2365452 | 1.3698834 | 1.71300 | 53.83 |
| 20, R8 | −26.474757 | 2.9640898 | | |

Figure 2:
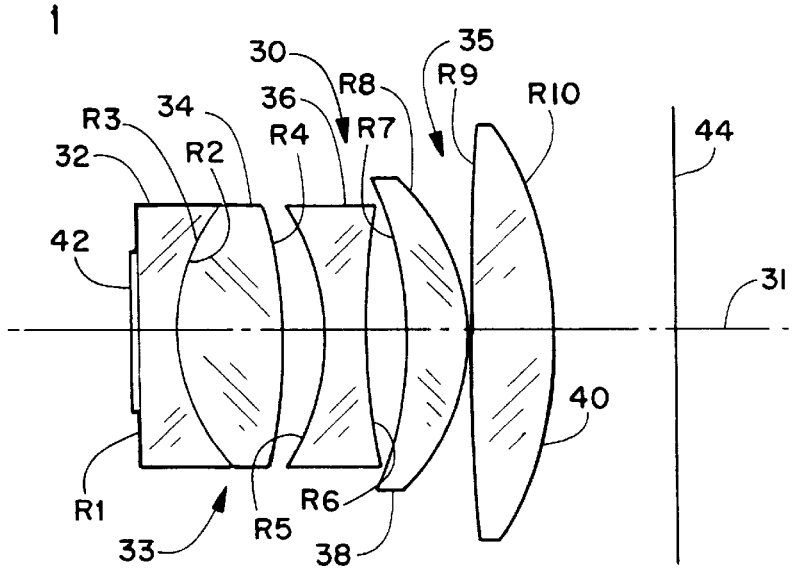
FIG. 2 is a schematic axial section view of a second embodiment of the lens of this invention.

FIG. 2 is a schematic axial section view through a lens 30. As with the lens of FIG. 1, the FIG. 2 lens is asymmetrical. Because of excellent correction of aberrations, lens 30, will provide excellent image quality over a field of view of +/−27 degrees at a relative aperture. Lens 30 is well suited for use with state of the art digital sensors having pixel sizes as small as four microns and a number of pixels as high as two million. The maximum geometric distortion of lens 30 is typically under about 2%.

Lens assembly 30 consists of five spherical glass elements along an axis 31. A bi-convex distal lens group 33 consists of elements 32 and 34. A proximal group 35 includes a first bi-concave element 36, a second meniscus element 38 and a third bi-convex element 40. The aperture stop plane is schematically indicated by line 42, closely adjacent to element 14. The image plane is indicated at 44. Distal group 33 provides most of the focussing power while proximal group 35 provides aberration compensation. Any suitable spacing between group 35 lens elements may be used. Aperture stop 42 is preferably as close to distal element 32 as practical. Lens 30 has a focal length of about 10 mm and is suitable for use with sensors having a diagonal size up to about 10 mm. Overall length from aperture stop 22 to image plane 12 is typically about 18 mm. is a very compact lens for one having these specifications, allowing the camera or other portable electronic device to be very low-profile.

Detailed structural parameters of an optimum lens of the sort shown in FIG. 2 are provided in Table II, wherein surface radius and axial distances are shown in millimeters and the surfaces are identified by radius serial numbers from the distal to the proximal end as shown.

TABLE II

| ELEMENT | RADIUS | AXIAL DISTANCE | INDEX OF REFRACTION | ABBE NUMBER |
|---|---|---|---|---|
| 42 Aperture Stop | | .069231426 | | |
| 32, R1 | 44.530099 | .74988524 | 1.60342 | 38.01 |
| 32, R2 | 3.6015366 | 1.8820225 | | |
| 34, R3 | 3.6015366 | 0.0 | 1.85544 | 36.59 |
| 34, R4 | −10.775653 | .8438336 | | |
| 36, R5 | −4.0121198 | .7499969 | 1.76182 | 26.55 |
| 36, R6 | 14.319591 | .72626772 | | |
| 38, R7 | −7.5483354 | 1.0981703 | 1.65950 | 57.35 |
| 38, R8 | −4.3839072 | .049998691 | | |
| 40, R9 | 52.604912 | 1.5000000 | 1.64050 | 60.10 |
| 40, R10 | −8.4658891 | 3.0506766 | | |

Figure 3:
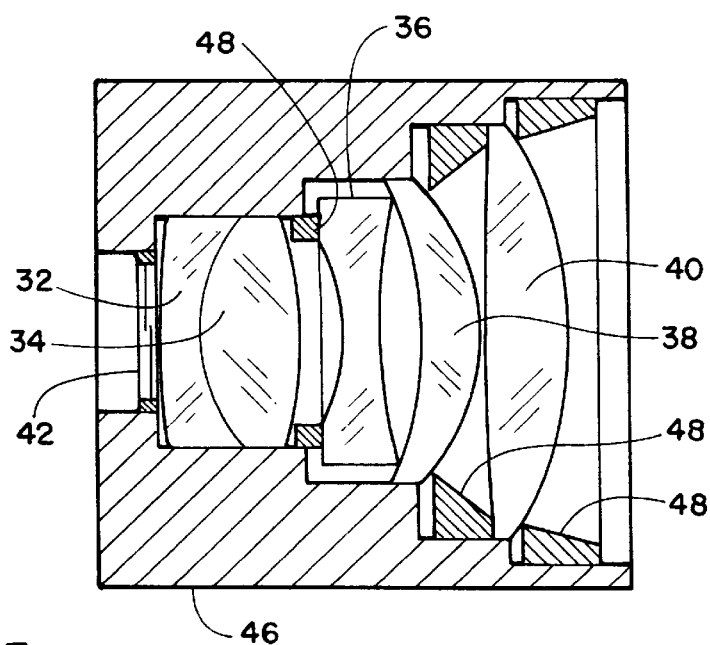
FIG. 3 is an axial section view through the embodiment of FIG. 1 mounted in a lens barrel.

FIG. 3 is a schematic axial section view through the lens of FIG. 2 mounted in a lens barrel. A plurality of rings 48 of suitable diameter are secured to the interior hold the lens elements in place. Preferably, cooperating threads are provided on the interior of barrel 46 and the outer edges of rings 48 so that the rings may be threaded into place. However, other methods, such as adhesive bonding, may be used if desired to hold rings 48 in place.

While certain specific relationships, materials and other parameters have been detailed in the above description of preferred embodiments, those can be varied, where suitable, with similar results. Other applications, variation and ramifications of the present invention will occur to those skilled in the art upon reading the present disclosure. Those are intended to be included within the scope of this invention as defined in the appended claims.

I claim:

1. A compact lens assembly which comprises:

a first, positively-powered, lens element group at a distal assembly end, said positively-powered group having from one to two elements;

a second lens element group spaced proximally from said first lens element group and having three elements, in order from said distal end, a bi-concave element, a meniscus element and a bi-convex element;

said lens assembly having an aperture stop located adjacent to said distal end of said lens at a predetermined distance therefrom; and said aperture stop comprising a combined variable aperture and shutter assembly at said predetermined aperture stop location.

2. The compact lens assembly according to claim 1 wherein all of said elements have spherical surfaces.

3. The compact lens assembly according to claim 1 wherein all of said elements are formed from glass.

4. The compact lens assembly according to claim 1 wherein said lens assembly has a focal length of about 4.5 mm and an overall length from said aperture stop to an image plane is about 8 mm.

5. The compact lens assembly according to claim 1 wherein said first group consists of a single bi-convex element.

6. The compact lens assembly according to claim 1 wherein said first group is an achromatic doublet having bi-convex outer surfaces.

7. The compact lens assembly according to claim 1 wherein the lens assembly satisfies the following data:

| Element, | Surface Radius | Axial Distance | Index of Refraction | Abbe Number |
| --- | --- | --- | --- | --- |
| 22 Aperture Stop | — | .019358679 | | |
| 14, R1 | 3.8630600 | .97497407 | 1.85544 | 36.59 |
| 14, R2 | −10.949689 | .41938736 | | |
| 16, R3 | −3.5840039 | .70701838 | 1.91761 | 21.51 |
| 16, R4 | 5.5340363 | .33068768 | | |
| 18, R5 | −6.0461650 | 1.2803852 | 1.80279 | 46.76 |
| 18, R6 | −2.8591050 | 0.0 | | |
| 20, R7 | 6.2365452 | 1.3698834 | 1.71300 | 53.83 |
| 20, R8 | −26.474757 | 2.9640898 | | | wherein the listed elements and surfaces are numbered from the distal end of said lens assembly.

8. The compact lens assembly according to claim 1 wherein the lens assembly satisfies the following data:

| ELEMENT | RADIUS | AXIAL DISTANCE | INDEX OF REFRACTION | ABBE NUMBER |
| --- | --- | --- | --- | --- |
| 42 Aperture Stop | | .069231426 | | |
| 32, R1 | 44.530099 | .74988524 | 1.60342 | 38.01 |
| 32, R2 | 3.6015366 | 1.8820225 | | |
| 34, R3 | 3.6015366 | 0.0 | 1.85544 | 36.59 |
| 34, R4 | −10.775653 | .8438336 | | |
| 36, R5 | −4.0121198 | .7499969 | 1.76182 | 26.55 |
| 36, R6 | 14.319591 | .72626772 | | |
| 38, R7 | −7.5483354 | 1.0981703 | 1.65950 | 57.35 |
| 38, R8 | −4.3839072 | .049998691 | | |
| 40, R9 | 52.604912 | 1.5000000 | 1.64050 | 60.10 |
| 40, R10 | −8.4658891 | 3.0506766 | | | wherein the listed elements and surfaces are numbered from the distal end of said lens assembly.

9. In a digital camera having a camera body, a sensor for forming a digital image corresponding to varying light image falling thereon, a lens for forming said light image, a variable aperture for varying light image intensity and a shutter for shielding the sensor during digital image read-out from said sensor, the improvement comprising:

said lens having four to five elements extending from a distal end to a proximal end adjacent to said sensor and comprising:

a first, positively-powered, lens element group at said distal end, said positively-powered group having from one to two elements;

a second lens element group spaced from said first lens element group an having three elements, in order from said distal end, a bi-concave element, a meniscus element and a bi-convex element;

all of said elements being spherical and formed from glass; and said lens assembly having an aperture stop located adjacent to said distal end of said lens at a predetermined distance therefrom; and said aperture stop comprising a combined variable aperture and shutter assembly at said predetermined aperture stop location.

10. The improvement according to claim 9 wherein said lens assembly has a focal length of about 4.5 mm and an overall length from said aperture stop to an image plane is about 8 mm.

11. The improvement according to claim 9 wherein said first group consists of a single bi-convex element.

12. The improvement according to claim 9 wherein said first group is an achromatic doublet having bi-convex outer surfaces.

13. The compact lens assembly according to claim 9 wherein the lens assembly satisfies the following data:

| ELEMENT | RADIUS | AXIAL DISTANCE | INDEX OF REFRACTION | ABBE NUMBER |
| --- | --- | --- | --- | --- |
| 42 Aperture Stop | | .069231426 | | |
| 32, R1 | 44.530099 | .74988524 | 1.60342 | 38.01 |
| 32, R2 | 3.6015366 | 1.8820225 | | |

-continued

| ELEMENT | RADIUS | AXIAL DISTANCE | INDEX OF REFRACTION | ABBE NUMBER |
|---|---|---|---|---|
| 34, R3 | 3.6015366 | 0.0 | 1.85544 | 36.59 |
| 34, R4 | −10.775653 | .8438336 | | |
| 36, R5 | −4.0121198 | .7499969 | 1.76182 | 26.55 |
| 36, R6 | 14.319591 | .72626772 | | |
| 38, R7 | −7.5483354 | 1.0981703 | 1.65950 | 57.35 |
| 38, R8 | −4.3839072 | .049998691 | | |
| 40, R9 | 52.604912 | 1.5000000 | 1.64050 | 60.10 |
| 40, R10 | −8.4658891 | 3.0506766 | | | wherein the listed elements and surfaces are numbered from the distal end of said lens assembly.

14. The compact lens assembly according to claim 9 wherein the lens assembly satisfies the following data:

| ELEMENT | RADIUS | AXIAL DISTANCE | INDEX OF REFRACTION | ABBE NUMBER |
|---|---|---|---|---|
| 42 Aperture Stop | | .069231426 | | |
| 32, R1 | 44.530099 | .74988524 | 1.60342 | 38.01 |
| 32, R2 | 3.6015366 | 1.8820225 | | |
| 34, R3 | 3.6015366 | 0.0 | 1.85544 | 36.59 |
| 34, R4 | −10.775653 | .8438336 | | |
| 36, R5 | −4.0121198 | .7499969 | 1.76182 | 26.55 |
| 36, R6 | 14.319591 | .72626772 | | |
| 38, R7 | −7.5483354 | 1.0981703 | 1.65950 | 57.35 |
| 38, R8 | −4.3839072 | .049998691 | | |
| 40, R9 | 52.604912 | 1.5000000 | 1.64050 | 60.10 |
| 40, R10 | −8.4658891 | 3.0506766 | | | wherein the listed elements and surfaces are numbered from the distal end of said lens assembly.

* * * * *